US011550990B2

(12) United States Patent
Jadhav et al.

(10) Patent No.: US 11,550,990 B2
(45) Date of Patent: Jan. 10, 2023

(54) MACHINE FIRST APPROACH FOR IDENTIFYING ACCESSIBILITY, NON-COMPLIANCES, REMEDIATION TECHNIQUES AND FIXING AT RUN-TIME

(71) Applicant: Tata Consultancy Services Limited, Mumbai (IN)

(72) Inventors: Charudatta Jadhav, Mumbai (IN); Sumeet Agrawal, Mumbai (IN); Suresh Kumar Ramasamy, Chennai (IN); Vibin Inigo Emerald, Chennai (IN); Udhaya Kumar, Chennai (IN); Shwetha Sundaresan, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/150,757

(22) Filed: Jan. 15, 2021

(65) Prior Publication Data

US 2021/0232755 A1    Jul. 29, 2021

(30) Foreign Application Priority Data

Jan. 17, 2020   (IN) .............................. 202021002209

(51) Int. Cl.
   *G06F 17/10*   (2006.01)
   *G06F 40/14*   (2020.01)
   (Continued)

(52) U.S. Cl.
   CPC .............. *G06F 40/14* (2020.01); *G06F 9/453* (2018.02); *G06F 11/3612* (2013.01); *G06F 16/986* (2019.01)

(58) Field of Classification Search
   CPC ........ G06F 40/14; G06F 9/453; G06F 16/986; G06F 11/3612
   See application file for complete search history.

(56) References Cited

U.S. PATENT DOCUMENTS 8,166,135 B2    4/2012  Ganesh et al.
8,406,528 B1 *  3/2013  Hatwich .................. G06T 7/13
                                                  382/199
(Continued)

FOREIGN PATENT DOCUMENTS

EP         3852032 A1 *  7/2021  .......... G06F 11/3612

OTHER PUBLICATIONS

Hernandez, Three Web Accessibility Evaluation Perspectives for RIA, Proceedings of the 10th International cross-disciplinary conference on web accessibility (Year: 2013).*

(Continued)

*Primary Examiner* — Shahid K Khan
(74) *Attorney, Agent, or Firm* — Finnegan, Henderson, Farabow, Garrett & Dunner, LLP (57) ABSTRACT

Accessibility in software engineering is treated as expensive, time consuming and hence adoption of accessibility, is a challenge despite stringent timelines and regulatory requirements published around the world. Moreover, cost of implementing accessibility increases project cost due to manual intervention and dependency on niche skills, which is scarce in industry. Embodiments of the present disclosure provide system and method for automated identification of applicable accessibility guidelines and determination of remediation techniques for fixing issues in webpages, wherein webpages are rendered, and applicable accessibility guidelines are identified based on user interface elements (UI) comprised in the webpages. Further, content associated with rendered webpages are analyzed using the applicable accessibility applicable guidelines to identify webpage non-compliance issue(s) and remediation technique(s) thereof. Fixes for the non-compliance issues are determined based on the webpages and applied on a document object model (Continued)

(DOM) based on a current state associated with the webpage and/or UI elements.

15 Claims, 7 Drawing Sheets

(51) Int. Cl.
    *G06F 9/451* (2018.01)
    *G06F 16/958* (2019.01)
    *G06F 11/36* (2006.01)

(56) References Cited

U.S. PATENT DOCUMENTS

| | | | |
|---|---|---|---|
| 8,572,549 B2 | 10/2013 | Ganesh et al. | |
| 8,607,251 B1* | 12/2013 | Guillory | G09B 21/00 |
| | | | 719/318 |
| 10,423,709 B1* | 9/2019 | Bradley | G06F 16/9577 |
| 10,650,185 B2* | 5/2020 | Wen | G06F 16/94 |
| 10,656,955 B1* | 5/2020 | Nguyen | G06F 9/453 |
| 2005/0187895 A1* | 8/2005 | Paya | G06F 16/958 |
| 2006/0195819 A1* | 8/2006 | Chory | G06F 16/958 |
| | | | 717/117 |
| 2006/0282771 A1* | 12/2006 | Vinci | G06F 40/143 |
| | | | 715/209 |
| 2009/0019378 A1* | 1/2009 | Kelkar | G06F 40/117 |
| | | | 715/760 |
| 2009/0150766 A1* | 6/2009 | Fukuda | G06F 40/154 |
| | | | 715/235 |
| 2010/0131797 A1* | 5/2010 | Ganesh | G06F 11/34 |
| | | | 714/21 |
| 2010/0205523 A1* | 8/2010 | Lehota | G06F 16/9577 |
| | | | 715/765 |
| 2012/0254723 A1* | 10/2012 | Kasa | G06F 40/226 |
| | | | 715/234 |
| 2013/0073949 A1* | 3/2013 | Barrell | H04L 9/3263 |
| | | | 713/176 |
| 2013/0290828 A1* | 10/2013 | Flake | G06F 16/532 |
| | | | 715/234 |
| 2015/0205882 A1* | 7/2015 | Vukas | G06F 11/3664 |
| | | | 707/758 |
| 2016/0313983 A1* | 10/2016 | Davidchuk | G06F 8/38 |
| 2017/0371975 A1* | 12/2017 | Chen | G06F 40/117 |
| 2019/0042397 A1* | 2/2019 | Vignesh R | G06F 11/3692 |
| 2019/0121633 A1* | 4/2019 | Chen | G06F 9/44526 |
| 2019/0340212 A1* | 11/2019 | Isager | G06F 16/972 |

OTHER PUBLICATIONS

Nádia Fernandes, Rui Lopes, and Luís Carriço. 2011. On web accessibility evaluation environments. In Proceedings of the International Cross-Disciplinary Conference on Web Accessibility (W4A '11). Association for Computing Machinery, New York, NY, USA, Article 4, 1-10. DOI:https://doi.org/10.1145/1969 (Year: 2011).*

Nádia Fernandes, Daniel Costa, Sergio Neves, Carlos Duarte, and Luís Carriço. 2012. Evaluating the accessibility of rich internet applications. In Proceedings of the International Cross-Disciplinary Conference on Web Accessibility (W4A '12). Association for Computing Machinery, New York, NY, USA, Art (Year: 2012).*

Leotta, Maurizio et al., "Robula+: An algorithm for generating robust XPath locators for web testing", Journal of Software: Evolution and Process, Mar. 2016, vol. 28, Issue 3, pp. 177-204, Wiley InterScience, https://www.researchgate.net/publication/299336358_Robula_An_algorithm_for_generating_robust_XPath_locators_for_web_testing/link/5a4609eea6fdcce1971a9650/download.

* cited by examiner

MACHINE FIRST APPROACH FOR IDENTIFYING ACCESSIBILITY, NON-COMPLIANCES, REMEDIATION TECHNIQUES AND FIXING AT RUN-TIME

PRIORITY CLAIM

This U.S. patent application claims priority under 35 U.S.C. § 119 to: India Application No. 202021002209, filed on Jan. 17, 2020. The entire contents of the aforementioned application are incorporated herein by reference.

TECHNICAL FIELD

The disclosure herein generally relates to automated remediation, and more particularly to, machine first approach for identifying accessibility, non-compliances, remediation techniques and fixing at run-time.

BACKGROUND

To enable persons with disabilities to obtain accessible online experience website must meet the requirements of accessibility standards Web Content Accessibility Guidelines (WCAG) published by W3C covers a wide range of recommendations for making web content more accessible. Following these guidelines will make content accessible to a wider range of people with disabilities, including blindness and low vision, deafness and hearing loss, learning disabilities, cognitive limitations, limited movement, speech disabilities, photosensitivity, and combinations of these. The website must help all kinds of people with disabilities access to various public accessibility of information services. It has been observed that now a days a website is created in manner such that users with disabilities can also access the website without other assistance. To facilitate web accessibility to the users with disabilities, it is essential to assess the web accessibility of the website before the website is deployed on a server.

Existing approach of accessibility development/remediation is a 4-step process excluding the initial planning phases which includes finding the guideline(s) applicability, identify the accessibility non-compliances, taking the decision for using right technique for remediation followed by applying the fixes. For the initial 2 steps, there are many tools out in the market. But the tools can verify only 25-29% of WCAG checkpoints. Hence conventionally, the accessibility implementations are a mix of manual interventions using assistive technologies and commercial or open-source automation tools wherein the automation in the accessibility value chain is limited only to the testing phase.

Also, the traditional method for identifying the accessibility guidelines applicability and non-compliances present in a webpage consisted of utilizing Hypertext Markup Language (HTML) Document Object Model (DOM) for identifying web elements present on a webpage wherein this method identifies each web element based on structure and semantic of HTML code, associated to each web element. Based on that it is only capable of identifying the web elements such as an image, a table, a heading, a list which can be termed/referred as basic web elements, with ease and thereby perform the web accessibility assessment on the basic web elements. However today with the internet evolution and growing user demand of richer and user-friendly website developers are creating rich user interface (UI) controls for ex carousels, menu bar, date pickers, sliders, expand and collapsible Panels, tree view, etc. These complex web elements cannot be identified based on the structure and the semantics of the HTML code or the HTML DOM because they do not have a defined structure or semantic of the HTML code. Further, they are interpreted as the basic web elements and are assessed in the same manner as the basic web elements are assessed by the automated tools. For example, a menu bar or a tree view is also made up of lists nested into each other. Reading the HTML markup or the DOM results in an ordinary list. Similarly, CAPTCHA is just an image along with a textbox and some additional links/buttons. The accessibility requirements of the complex web elements are different and more complicated than that of the basic web elements. Therefore, due to complexity in identification of the complex web elements, manual effort is required to identify each web element before assessing the web accessibility and hence increases the effort of the web accessibility assessment.

Further, in development phase it is completely human dependent and requires a subject matter expert (SME) to identify accessibility guideline applicability, issue(s), and remediation (fixing the issue). Till date developers have been reluctant towards achieving accessibility in their applications. The first reason being the steep learning curve for the developers to understand how the people with disabilities interact with technology, the assistive technology tools used by them, and what their needs are in spite of the presence of the testable statements for each success criteria. Developers find accessibility implementation as a complex problem as there are instances where more than one technique is available to meet the success criteria. Most of the production time is spent on exploring and finding the right techniques to implement in order to fix the issues. All these lead to additional efforts and time required to achieve accessibility and in turn adding to the cost of development.

SUMMARY

Embodiments of the present disclosure present technological improvements as solutions to one or more of the above-mentioned technical problems recognized by the inventors in conventional systems. For example, in one aspect, there is provided a processor implemented method for automated identification of applicable accessibility guidelines, accessibility non-compliances issues, and determination of remediation techniques for fixing the accessibility non-compliances issues in webpages. The processor implemented method comprises: rendering during a first mode, by one or more hardware processors, one or more webpages associated with one or more enterprise web applications to be assessed for accessibility; automatically identifying during the first mode, by the one or more hardware processors, one or more applicable accessibility guidelines, based on one or more user interface elements (UI) comprised in the one or more rendered webpages; automatically analyzing during the first mode, via one or more analysing techniques executed by the one or more hardware processors, content associated with the one or more rendered webpages using the one or more applicable accessibility applicable guidelines to identify one or more webpage non-compliance issues; automatically identifying by the one or more hardware processors, one or more remediation techniques based on the one or more webpage non-compliance issues being identified; automatically determining, via the one or more remediation techniques executed by the one or more hardware processors, a number of fixes for the one or more webpage non-compliance issues based on the one or more webpages being rendered.

The method further comprises applying, in a second mode, the number of determined fixes on a document object model (DOM) based on a current state of at least one of (i) the one or more rendered webpages and (ii) the one or more user interface elements comprised in the one or more rendered webpages to obtain one or more accessibility guidelines compliant-based webpages.

In an embodiment, the current state of the at least one of (i) the one or more rendered webpages and (ii) the one or more user interface elements comprised in the one or more rendered webpages is indicative of the captured behavior of one or more user interface elements, and wherein the captured behaviour comprises at least one of (a) one or more mutation events, (b) a new page load event, (c) a page layout change events, and (d) one or more network calls.

In an embodiment, the one or more non-compliance issues in the one or more webpages are subjected to change in accordance with the change in the captured behavior of one or more user interface elements of the one or more webpages.

The method further comprises determining, during the first mode, a change in the current state of at least one of (i) the one or more rendered webpages and (ii) the one or more user interface elements comprised in the one or more rendered webpages; and identifying, during the first mode, based on the change in the current state, a set of non-compliance issues.

In another aspect, there is provided a system for automated identification of applicable accessibility guidelines, accessibility non-compliances issues, and determination of remediation techniques for fixing the accessibility non-compliances issues in webpages. The system comprises a memory storing instructions; one or more communication interfaces; and one or more hardware processors coupled to the memory via the one or more communication interfaces, wherein the one or more hardware processors are configured by the instructions to: render, during a first mode, one or more webpages associated with one or more enterprise web applications to be assessed for accessibility; automatically identify during the first mode, by the one or more hardware processors, one or more applicable accessibility guidelines, based on one or more user interface elements (UI) comprised in the one or more rendered webpages; automatically analyze during the first mode, via one or more analysing techniques executed by the one or more hardware processors, content associated with the one or more rendered webpages using the one or more applicable accessibility guidelines to identify one or more webpage non-compliance issues; automatically identify by the one or more hardware processors, one or more remediation techniques based on the one or more webpage non-compliance issues being identified; automatically determine, via the one or more remediation techniques executed by the one or more hardware processors, a number of fixes for the one or more webpage non-compliance issues based on the one or more webpages being rendered.

The one or more hardware processors are further configured by the instructions to apply, in a second mode, the number of determined fixes on a document object model (DOM) based on a current state of at least one of (i) the one or more rendered webpages and (ii) the one or more user interface elements comprised in the one or more rendered webpages to obtain one or more accessibility guidelines compliant-based webpages.

In an embodiment, the current state of the at least one of (i) the one or more rendered webpages and (ii) the one or more user interface elements comprised in the one or more rendered webpages is indicative of the captured behavior of one or more user interface elements, and wherein the captured behaviour comprises at least one of (a) one or more mutation events, (b) a new page load event, (c) a page layout change events, and (d) one or more network calls.

In an embodiment, the one or more non-compliance issues in the one or more webpages are subjected to change in accordance with the change in the captured behavior of one or more user interface elements of the one or more webpages.

The one or more hardware processors are further configured by the instructions to determine, during the first mode, a change in the current state of at least one of (i) the one or more rendered webpages and (ii) the one or more user interface elements comprised in the one or more rendered webpages; and identify, during the first mode, based on the change in the current state, a set of non-compliance issues.

In yet another aspect, there are provided one or more non-transitory machine readable information storage mediums comprising one or more instructions which when executed by one or more hardware processors causes automated identification of applicable accessibility guidelines, accessibility non-compliances issues, and determination of remediation techniques for fixing the accessibility non-compliances issues in webpages and determination of remediation techniques for fixing issues in webpages by rendering during a first mode, by the one or more hardware processors, one or more webpages associated with one or more enterprise web applications to be assessed for accessibility; automatically identifying during the first mode, by the one or more hardware processors, one or more applicable accessibility guidelines, based on one or more user interface elements (UI) comprised in the one or more rendered webpages; automatically analyzing during the first mode, via one or more analysing techniques executed by the one or more hardware processors, content associated with the one or more rendered webpages using the one or more applicable accessibility applicable guidelines to identify one or more webpage non-compliance issues; automatically identifying by the one or more hardware processors, one or more remediation techniques based on the one or more webpage non-compliance issues being identified; automatically determining, via the one or more remediation techniques executed by the one or more hardware processors, a number of fixes for the one or more webpage non-compliance issues based on the one or more webpages being rendered.

The instructions which when executed further cause the hardware processors to apply, in a second mode, the number of determined fixes on a document object model (DOM) based on a current state of at least one of (i) the one or more rendered webpages and (ii) the one or more user interface elements comprised in the one or more rendered webpages to obtain one or more accessibility guidelines compliant-based webpages.

In an embodiment, the current state of the at least one of (i) the one or more rendered webpages and (ii) the one or more user interface elements comprised in the one or more rendered webpages is indicative of the captured behavior of one or more user interface elements, and wherein the captured behaviour comprises at least one of (a) one or more mutation events, (b) a new page load event, (c) a page layout change events, and (d) one or more network calls.

In an embodiment, the one or more non-compliance issues in the one or more webpages are subjected to change in accordance with the change in the captured behavior of one or more user interface elements of the one or more webpages.

The instructions which when executed further cause the hardware processors to determine, during the first mode, a change in the current state of at least one of (i) the one or more rendered webpages and (ii) the one or more user interface elements comprised in the one or more rendered webpages; and identify, during the first mode, based on the change in the current state, a set of non-compliance issues.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments of the present disclosure provide system and method that can help enterprises to meet the mandatory regulatory compliance with minimum time and effort and to minimize the legal risk.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

Figure 1:
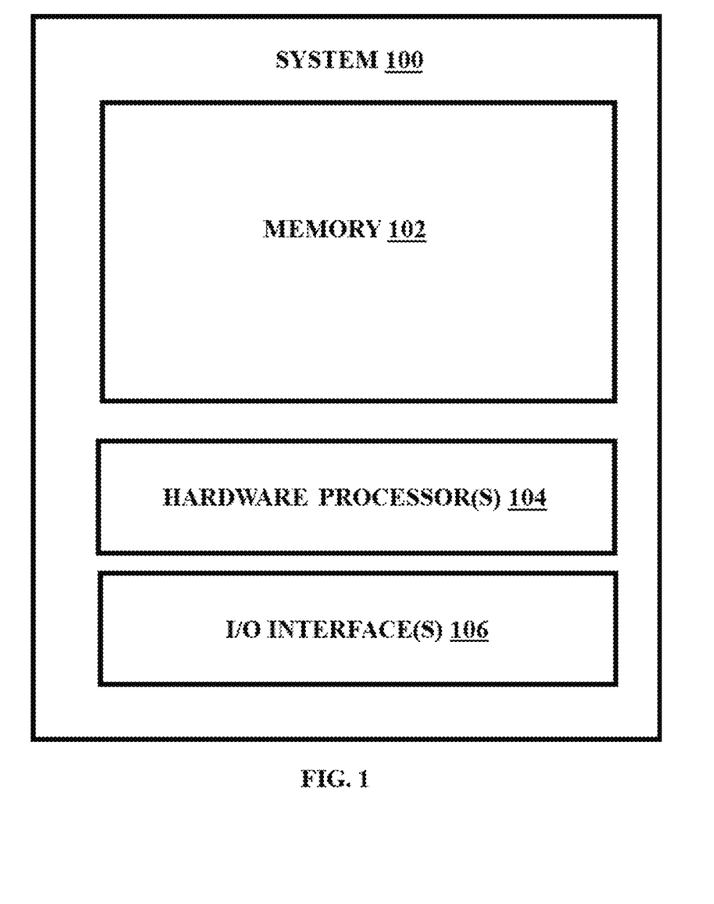
FIG. 1 illustrates an exemplary block diagram of a system that implements a machine first approach for identifying accessibility, non-compliances, remediation techniques and fixing at run-time, in accordance with an embodiment of the present disclosure.

FIG. 1 illustrates an exemplary block diagram of a system that implements a machine first approach for identifying accessibility, non-compliances, remediation techniques and fixing at run-time, in accordance with an embodiment of the present disclosure. More specifically, FIG. 1 depicts an exemplary block diagram of a system 100 for automated identification of applicable accessibility guidelines and determination of remediation techniques for fixing issues in webpages, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 includes one or more data storage devices or memory 102 operatively coupled to the one or more processors 104 and is configured to store instructions configured for execution of steps of the method 200 by the one or more processors 104.

Figure 2:
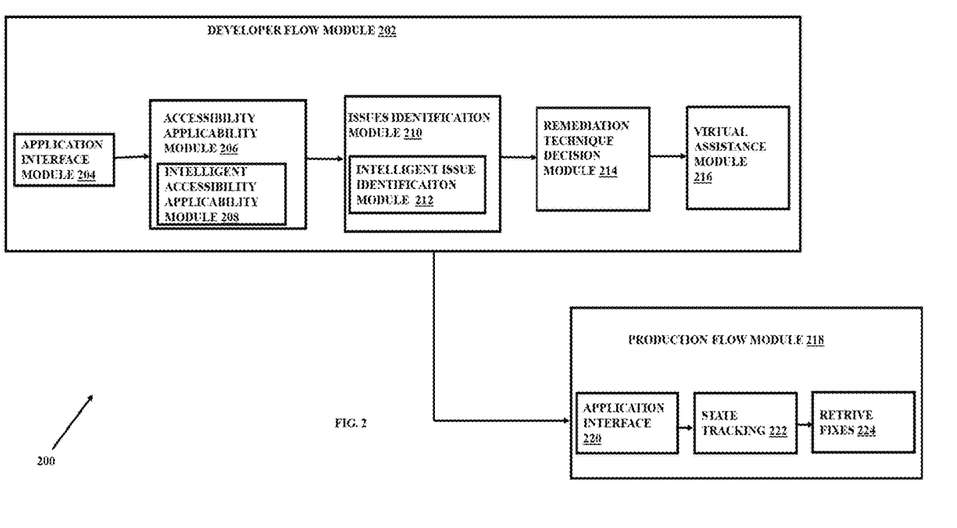
FIG. 2 illustrates a functional block diagram of an intelligent system that implements a machine first approach for identifying accessibility, non-compliances, remediation techniques and fixing at run-time, in accordance with an embodiment of the present disclosure.

FIG. 2 illustrates a functional block diagram of an intelligent system that implements a machine first approach for identifying accessibility, non-compliances, remediation techniques and fixing at run-time, in accordance with an embodiment of the present disclosure. More specifically, FIG. 2, with reference to FIG. 1, depicts a functional block diagram of the system for automated identification of applicable accessibility guidelines and determination of remediation techniques for fixing issues in webpages, in accordance with an embodiment of the present disclosure. In an embodiment, the system 200 includes a developer flow module 202 and a production flow module 218. The developer flow module 202 further includes an application interface module 204, an accessibility applicability module 206, an issues identification module 210, a remediation technique decision module 214, and a virtual assistance module 216. The production flow module 218 of the system 200 further includes an application interface module 220, a state tracking module 222 and a retrieve fixes module 224. The accessibility applicability module 206 further includes an intelligent accessibility applicability module 208. The issues identification module 210 further includes intelligent issue identification module 212. The developer flow module 202 of the system 200 is used by developers to get the required accessibility fixes ready while the production flow module 218 is used to remediate the application in production. The present disclosure makes use of a database (comprised in the memory 102 or also referred as the memory 102) to store the data captured and required by developer flow module. The fixes data will be carried over to production flow. The database is (or may be) comprised in the memory 102, in one embodiment.

Referring to the FIG. 2, the developer flow module 202 is configured to identify the accessibility non-compliance issues in the enterprise application and the corresponding fixes. As the developer is enabled via interface(s) 106 for navigation through the enterprise application (or a web page), the present disclosure/system monitors the loading of one or more pages and mutation (group of changes happening on a previously loaded page) events and the network, analyses the webpage and identifies the accessibility non-compliance issues, determines the fixes, stores them for production flow. The mutation events further comprise content change and user interface (UI) element change/transformation, in one example embodiment. Further where there are options to choose from and where there are human judgements involved, the developer's inputs are taken. The present disclosure provides one user interface component for each browser, each making use of the one or more technologies supported by the respective browsers (e.g., chrome extension in case of Google® chrome). During the developer flow as implemented by the system, the enterprise application pages are injected with a script from application interface module 204, when they are sent from the server to the browser. This script takes care of notifying new page and page layout change events to developer flow module 202, along with the data (e.g., HTML and mutation records) and one or more states of the webpage or UI element(s) comprised in the webpage. A "state" is the state of the application (or an individual component comprised in the webpage) after a page load or mutation has happened. Each state corresponds to a set of fixes to be applied. When the developer expresses his/her intent to work on a new state, the developer flow module 202 retrieves the network calls tracked by application interface module 204. Further, state identification rules are determined from the HTML, the event type (whether page load or mutation) and the network calls in that state, so that the system 200 recognizes the state later. The present disclosure demonstrates the following abilities to access the enterprise application's HTML, including the contents of iFrames, the final styles applied on various elements, the various resources such as Cascading Style Sheets (CSS), JavaScript. Further abilities of the system include applying changes on the DOM for the purpose of highlighting elements or applying fixes over them. In an embodiment, the accessibility applicability module 206 of the system 200 is configured to identify the applicability of accessibility checkpoints for each element. Further not all the checkpoints are applicable to an element all the time. For example, the media content (audio and videos), based on the presence of such content the guidelines applicable is determined. For a table element, different checkpoints are applicable, based on whether it is used for presentation purpose or if it contains information. The present disclosure provides support for inputs provided by the developers which includes inputs specifying the applicability of accessibility checkpoints (e.g., whether a table element is used for presentation purpose or if it contains information), and inputs directly indicating the presence of non-compliance (e.g., whether the given alternative text is appropriate for the image). In an embodiment, the intelligent accessibility applicability module 208 of the system 200 makes use of user interaction simulation techniques and artificial intelligence in deciding the applicability of accessibility checkpoints. Not all identifications can be achieved by checking the syntax alone and hence proposed disclosure Automated Compliance Remediation System (ACRS) addresses one set of such challenges by analyzing the behavior of the application which is done not only during identification of non-compliance issues, but even before, to check the applicability of certain guidelines. In the HTML, a menu-bar, for example, is defined using plain tags such as div, or li only. However, the associated CSS definitions and JavaScript provide the functionality of a menu-bar. The present disclosure/system gets the page rendered, simulates the user interaction, observes how the page reacts and decides if a menu-bar is present. This technique demands detailed study of the different ways a user interface could be implemented. For example, tabs can be achieved using buttons or links; a horizontal menu-bar and a vertical menu-bar expand and collapse on different keys. The present disclosure takes all the above-mentioned points into account. Further, using artificial intelligence (AI) techniques (as known in the art technique(s)), the images are classified as informative or decorative, whether a list has been used solely for the purpose of visual presentation and so on.

In an embodiment, the issues identification module 210 of the system 200 is configured to identify the non-compliance issues which is done automatically or based on inputs given earlier in accessibility applicability module 206. The accessibility issues are identified by analyzing the syntactic structure of the web page. Examples include checking the presence of alt-attributes in the IMG element (or image element), checking the presence of heading semantic, checking the presence of explicit association of labels with the form inputs. The intelligent issues identification module 212 of the system 200 makes use of user interaction simulation techniques and artificial intelligence to identify non-compliance issues. The interaction simulation technique(s) and AI as known in the art may be implemented and invoked for execution by the system of the present disclosure thereby enabling identification of the non-compliance issues present in a webpage being rendered. The present disclosure gets the page rendered, simulates the user interaction, observes how the page reacts and decides if a non-compliance is present. For example, once the progress-bar/slider is recognized, intelligent issues identification module 212 applies keyboard emulation to check if all the controls receive keyboard focus, have visible keyboard focus indicator, appropriate slides roles are applied to widget (e.g., again keyboard emulation is to be applied). Further, the emulation technique demands detailed study of the different ways a user interface could be implemented. For example, tabs can be achieved using buttons or links and for different ways, the behavior may vary wherein a horizontal menu-bar and a vertical menu-bar expand and collapse on different keys. The present disclosure takes all the above-mentioned points into account. Natural Language Processing can be used to check if the given alternate text/title is a dummy text or not, machine learning can be used to determine the association between a form element and its label and so on.

In an embodiment, the remediation technique decision module 214 of the system 200 is configured to automatically identify one or more fixes to make the element compliant. Alternative, the one or more fixes may be identified with or without one or more user inputs. The fix for each identified issue falls under one of the following categories:

1. Automatic identification of fix without any input from the developer (e.g., remove the alternate text provided for a decorative image).
2. Where there are options to choose from and where there are human judgements required, the developer's inputs are taken (e.g., label for button; value for text-color when its contrast ratio with background color is inadequate (human intervention may be required to adhere to the enterprise's branding guidelines)).
3. As with issues identification, the present disclosure uses artificial intelligence techniques (as known in the art) for fixing the issues. For example, transcript for streamed audio, including speaker identification, can be generated in real-time.
4. Developer specifies simple HTML and JavaScript fixes (e.g., a new label element for a form control which has neither label nor title associated with it).
5. Exceptions to above will have to be handled by the developer by fixing the source itself.

Referring to FIG. 2, the virtual assistance module 216 of the system 200 is configured to provide step by step guidance to remediate the issue for the given scenario. The present disclosure utilizes virtual assistance (VA) technology (e.g., VA technique as known in the art) in a way that completely avoids the need for the developers to have prior accessibility knowledge. Further, this assistant has an in-built knowledge base of accessibility guidelines and can walk the developer through the theory as well as provide step-by-step guidance to remediate the issue for the given scenario. The production flow module 218 of the system 200 is meant to remediate the accessibility non-compliance issues in enterprise application pages. During production/user flow, the application pages are remediated on the fly i.e., the remediation happens as part of the response cycle from the application (or webpage), as soon as the rendering of the page is complete before the user can interact. There will be no separate user interface other than the enterprise application UI. During the production flow of the present disclosure, the enterprise application pages are injected with a script from application interface module 220, when they are sent from the server to the browser wherein this script takes care of 1. Identifying new page and page layout change events.
2. Fetching fixes from retrieve fixes module 224.
3. Applying the fixes on the DOM, making the page accessibility compliant.

The application interface module 220 further communicates the network requests received by it to the production flow module 218. The state tracking module 222 of system 200 is configured to log the network calls intimated by the enterprise application/webpage for each user session. Further, the state tracking module 222 of system 200 is configured to determine the state of the application using state identification rules, based on the network calls and the HTML. In an embodiment, the retrieve fixes module 224 takes the help of the state tracking module 222 to identify the state and fetch the corresponding remediation fixes and returns the same to the application interface module 220.

Figure 3A:
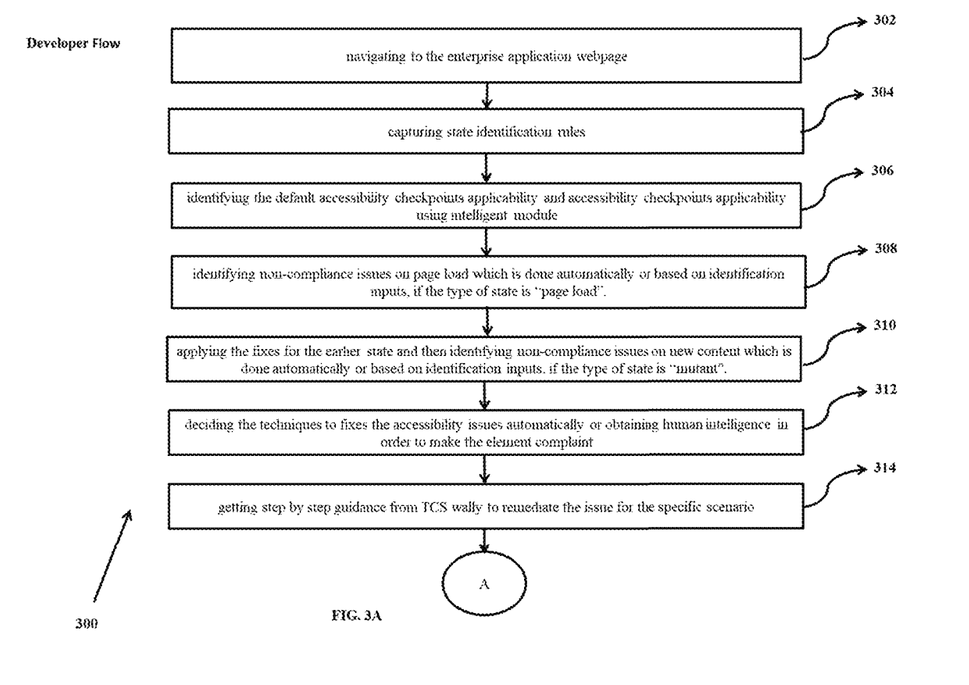
FIGS. 3A and 3B is a flowchart illustrating the method involved in intelligent system that implements a machine first approach for identifying accessibility, non-compliances, remediation techniques and fixing at run-time, in accordance with an embodiment of the present disclosure.
Figure 3B:
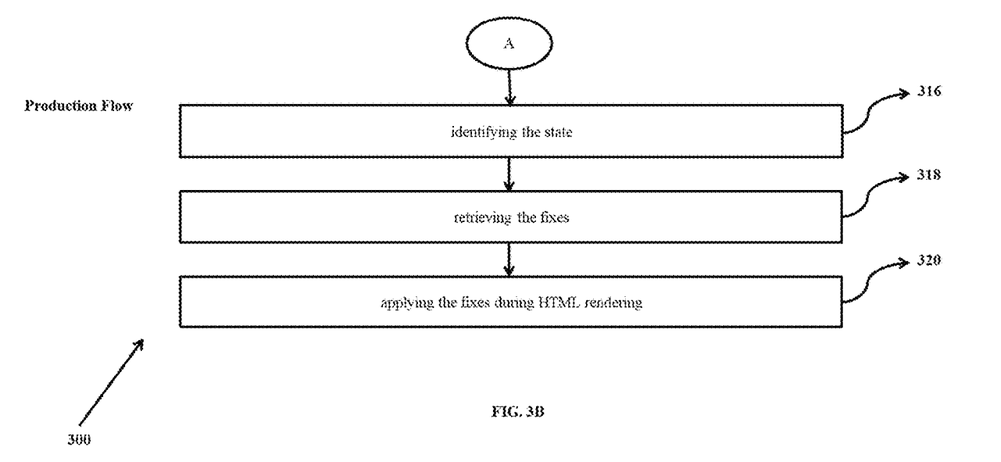

FIGS. 3A and 3B is a flowchart illustrating the method involved in intelligent system that implements a machine first approach for identifying accessibility, non-compliances, remediation techniques and fixing at run-time, in accordance with an embodiment of the present disclosure. More specifically, FIGS. 3A and 3B, depict a flowchart illustrating a method for automated identification of applicable accessibility guidelines and determination of remediation techniques for fixing issues in webpages, in accordance with an embodiment of the present disclosure. Steps of the method of FIGS. 3A and 3B are performed in conjunction with modules of system 200, as explained in FIG. 2. At step 302 of the method 300, the one or more hardware processors 104 enable navigation through/to the enterprise application webpage. At step 304, state identification rules are captured. At step 306, default accessibility checkpoints applicability and accessibility checkpoints applicability are identified using the modules 206 and 208 respectively. At step 308, if the type of state is "page load", non-compliance issues on page load is identified which is done automatically or based on identification inputs. At step 310, if the type of state is "mutant", the fixes for the earlier state are applied and then non-compliance issues on new content are identified which is done automatically or based on identification inputs. At step 312, the remediation techniques are decided to fix the accessibility issues automatically or human intelligence is obtained in order to make the element (e.g., one or more UI elements comprised in the webpage) compliant. At step 314, a step-by-step guidance is provided by the system of the present disclosure to remediate the issue for the specific scenario. At step 316, identify the state. At step 318, the fixes are retrieved. At step 320, the fixes are applied during HTML rendering.

Figure 4:
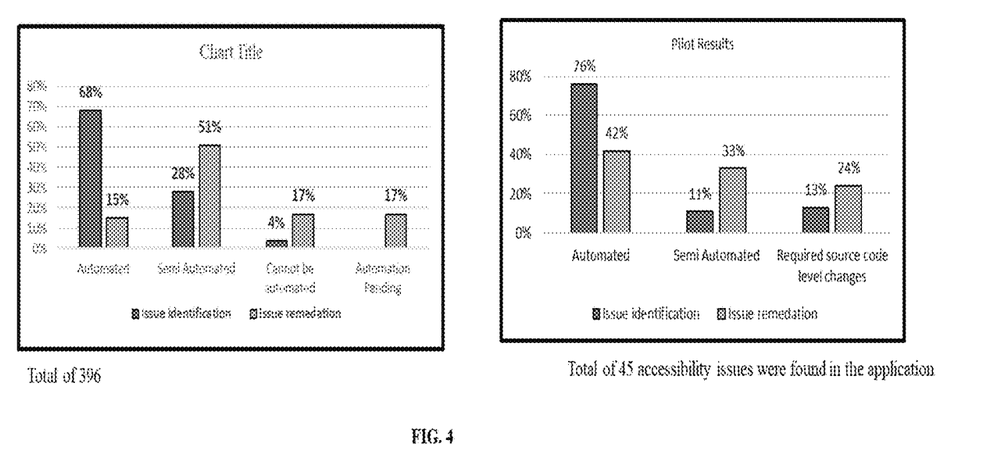
FIG. 4 illustrates the pilot results in conjunction with the method and intelligent system that implement a machine first approach for identifying accessibility, non-compliances, remediation techniques and fixing at run-time, in accordance with an embodiment of the present disclosure.

FIG. 4 illustrates the pilot results in conjunction with the method and intelligent system that implement a machine first approach for identifying accessibility, non-compliances, remediation techniques and fixing at run-time, in accordance with an embodiment of the present disclosure. More specifically, FIG. 4, with reference to FIGS. 1 through 3B, depicts graphical representations illustrating performance results of the method and the system of the present disclosure. The performance of the system was measured by two parameters which includes automation coverage % in identification of accessibility non-compliance and remediation (Fixing issues). The pilot test of ACRS (Accessibility Compliance and Remediation System), automated identification of accessibility non-compliance to 96% of the checkpoints (68% automatically and 28% with developer's input) out of 394 checkpoints of WCAG success criteria. For issue fixing the present disclosure can provide coverage for 66% of the checkpoints (15% automatically and 51% with developers input) for remediation. As part of pilot, the ARS system was able to identify 76% of the issues automatically and 11% issues with developer's input. Further, for issue fixing ARS was able to remediate 42% of the issues automatically and 33% of the issues with developer's input wherein the remaining 24% of issues required source code level changes hence had to address manually.

Figure 5:
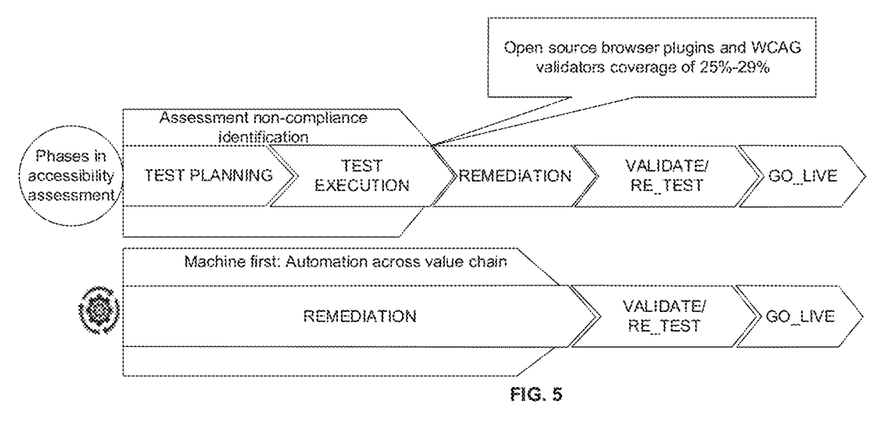
FIG. 5 illustrates the use case explaining the steps involved in the process of machine first approach for identifying accessibility, non-compliances, remediation techniques and fixing at run-time, in accordance with an embodiment of the present disclosure.

FIG. 5 illustrates the use case explaining the steps involved in the process of the intelligent system for accessible software with machine first approach, in accordance with some embodiments of the present disclosure. More specifically, FIG. 5 illustrates the use case explaining the steps involved in the process of machine first approach for identifying accessibility, non-compliances, remediation techniques and fixing at run-time, in accordance with an embodiment of the present disclosure. The present disclosure is automating across the value chain helps in transforming the accessibility implementation and bring the effort and cost implications to the minimum. Introducing Machine First approach by a machine performing the 3 key activities—test planning, test execution, and development/remediation. The technological solution as described herein by the present disclosure and the method and system associated herewith eliminate the first cycle of testing from the accessibility implementation process as shown in FIG. 5 and directly starts with automated remediation phase with minimal manual involvement. Further, with this reduction in efforts, entities such as organizations will be able to deliver accessibility services in lesser time which helps client(s) to meet the mandatory deadline of regulatory compliance. Thus, the system and method help in making accessibility an integral part of the entire software system.

Figure 6:
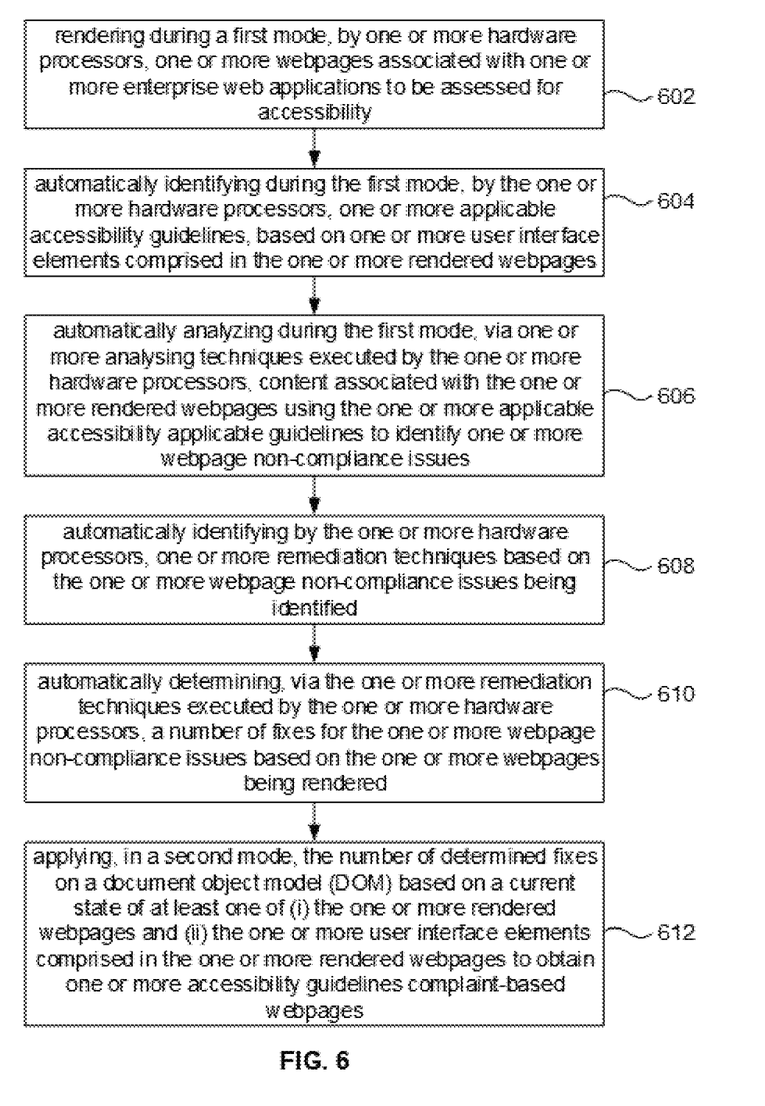
FIG. 6 depicts an exemplary flow chart illustrating a method that implements a machine first approach for identifying accessibility, non-compliances, remediation techniques and fixing at run-time, using the systems of FIG. 1 and FIG. 2, in accordance with an embodiment of the present disclosure.

FIG. 6, with reference to FIGS. 1 through 5, depicts an exemplary flow chart illustrating a method for automated identification of applicable accessibility guidelines and determination of remediation techniques for fixing issues in webpages at run-time, in accordance with an embodiment of the present disclosure, using the systems of FIG. 1 and FIG. 2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 and 200 of FIGS. 1, 2, and the flow diagram as depicted in FIGS. 3A and 3B. In an embodiment, at step 602 of the present disclosure, the one or more hardware processors 104 render, during a first mode, one or more webpages associated with one or more enterprise web applications to be assessed for accessibility. In an embodiment, at step 604 of the present disclosure, the one or more hardware processors 104 automatically identify, during the first mode, one or more applicable accessibility guidelines, based on one or more user interface elements comprised in the one or more rendered webpages (e.g., refer Patent application 4245/MUM/2015 titled 'SYSTEM AND METHOD FOR IDENTIFYING WEB ELEMENTS PRESENT ON A WEB-PAGE'). In an embodiment, the current state of the at least one of (i) the one or more rendered webpages and (ii) the one or more user interface elements comprised in the one or more rendered webpages is indicative of the captured behavior of the one or more user interface elements, and wherein the captured behaviour comprises at least one of (a) one or more mutation events (e.g., content change and UI element change), (b) a new page load event, (c) a page layout change events, and (d) one or more network calls. It is to be understood by a person having ordinary skill in the art or person skilled in the art that the one or more applicable accessibility guidelines may be identified with or without user inputs. The above step of identifying the applicable accessibility guidelines as depicted in 204 may be better understood by way of following examples. For instance, depending on the UI elements present in the screen, or the page layout, the applicability of the accessibility guideline success criteria is determined by the system. For example, if element like image is present in the screen then the guidelines applicable for the page would be 1.1.1 Non-text Content (WCAG 2.0 Level A), 1.3.3 set of color ((WCAG 2.0 Level A), 1.4.5 Images of Text (WCAG 2.0 Level AA), 1.4.9 Images of Text (No Exception) ((WCAG 2.0 Level AAA), 1.4.6 Contrast (Enhanced) (WCAG 2.0 Level AAA), and the like. It is to be understood by a person having ordinary skill in the art or person skilled in the art that the above examples of the applicable accessibility guidelines shall not be construed as limiting the scope of the present disclosure. Also, if the images are decorative then applicable set of checkpoints for decorative images are identified and incase of informative the applicable checkpoints are identified, in one example embodiment.

Referring to the steps of FIG. 6, at step 606 of the present disclosure, the one or more hardware processors 104 automatically analyze, during the first mode, via one or more analysing techniques executed by the one or more hardware processors, content associated with the one or more rendered webpages using the one or more applicable accessibility applicable guidelines to identify one or more webpage non-compliance issues. In other words, the system of FIGS. 1 and 2 utilizes one or more analysing technique(s) as known in the art to automatically analyse content associated with the one or more rendered webpages with the help of accessibility guidelines identified in the previous step. In one embodiment, the one or more non-compliance issues in the one or more webpages are subjected to change in accordance with the change in the captured behavior of the one or more user interface elements of the one or more webpages. HTML content is syntactically analyzed for identifying the one or more non-compliance issues. For instance, when the guideline specifies that an alternate text should be specified for informative images and an alternate text should not be specified for decorative images, the identification part is a simple automation of looking for the presence/absence of various ways (alt, aria-labeled, aria-label, title attributes) and the alternate text could be specified, in one example embodiment of the present disclosure (e.g., refer issue identification and content analysis as described above).

At step 608 of the present disclosure, the one or more hardware processors 104 automatically identify one or more remediation techniques based on the one or more webpage non-compliance issues being identified; and at step 610 a number of fixes are automatically identified for the one or more webpage non-compliance issues based on the one or more webpages being rendered, via the one or more remediation techniques. At step 612 of the present disclosure, the one or more hardware processors 104 apply, in a second mode, the number of determined fixes on a document object model (DOM) based on a current state of at least one of (i) the one or more rendered webpages and (ii) the one or more user interface elements comprised in the one or more rendered webpages to obtain one or more accessibility guidelines compliant-based webpages. The first mode and the second mode are different from each other (or are distinct from each other). For instance, the first mode is offline mode, and the second mode is an online mode. In another instance, the first mode is a development mode, and the second mode is a deployment/production mode. Moreover, during the first mode, the method further determining a change in the current state of at least one of (i) the one or more rendered webpages and (ii) the one or more user interface elements comprised in the one or more rendered webpages; and identify, during the first mode, a set of non-compliance issues based on the change in the current state. For example, during the development mode, there could be a change in the current state of webpages and UI elements that may a trigger the existing identified non-compliance issues to be of greater severity from being low or medium to high severity issue or a set of new non-compliance issues may be observed. These new set of non-compliance issues are also determined and fixed accordingly. The steps 602 till 612 (including the steps of determining the change in the current state of webpages and UI elements and identifying the set of new non-compliance issues and fixing them) are automatically carried out by the method and system of the present disclosure via one or more techniques executed by the hardware processors 104, in one example embodiment. The steps 602 till 612 (including the steps of determining the change in the current state of webpages and UI elements and identifying the set of new non-compliance issues and fixing them) are carried out by the method and system of the present disclosure via one or more techniques executed by the hardware processors 104 with user inputs/human intervention as applicable, in another example embodiment.

Embodiments of the present disclosure provide system and method that automatically identify applicable accessibility guidelines and determine remediation techniques for fixing issues in webpages being rendered. More specifically, the present disclosure provides a method and intelligent system for accessibility compliance in software life cycle. In conjunction with the above process the present disclosure includes the features which are described below:

1. Storing the remediation fixes in the form of changes to DOM and applying them during run-time wherein this technique reduces the time and effort taken to remediate an application significantly and further the activity of analyzing the code to identify the source of a non-compliance is minimized.
2. Identifying which webpage is present in user screen (or more specifically, the state of the enterprise application) using the combination of presence of specified structures in the HTML and presence of specified resources in the network requests, wherein this technique helps to address the following challenges:
    a. There is no identification for a HTML at the document level.
    b. The request uniform resource locator (URL) need not specify the HTML resource but can just be a string that will be mapped internally to a resource file, servlet, service, etc. in web server.
    c. AJAX makes it possible to change the page without getting full HTML, but just required data from the back end.
    d. The HTML layout of a page is not the same all the times wherein data can alter the layout; the user interaction can lead to layout changes. Hence hash of the page (even after leaving out the contents) does not help.
    e. Single-page applications (SPAs) dynamically rewrite the current page rather than loading entire new pages from the server.
3. Locating the HTML element to apply the fix through an additional attribute containing pre-remediation XPath than retrieving the element using XPath. This technique helps to address the following challenges:
    a. Though HTML supports id attribute for all tags, it is not guaranteed that the id attribute is present for all the elements to be fixed. Also, in some cases, the id values may get generated during run-time and hence not suitable to get stored.
    b. While XPath of an element is a better alternative to id attribute, as the fixes are applied, the structure of the DOM changes and the XPaths are no longer the same.
4. Overwriting the non-compliant styling values using inline CSS for the HTML element.

For one, the CSS cannot be modified during run-time, and for the other, when a CSS is modified it has unintended impact on some other elements. The present disclosure uses the technique of leaving CSS definitions as-is but overwriting the required value in the HTML (DOM).

5. Using mutations application programming interface (API) to detect page load event.

A multi-page application's page load can be recognized by registering for that event. However, the same technique cannot be used to recognize the loading of a single-page application's page. The present disclosure uses the technique of monitoring the HTML element containing the page contents with the help of Mutations API. For both MPA and SPA, the present disclosure uses mutations API to detect change in the state of the application.

In a mutation scenario, a significant set of accessibility issues present before mutation are also present after mutation. The issues identified in before state should not be identified again in after state. To overcome this, incremental identification is carried out; otherwise during fixes identification stage, there may be chances of duplicate effort; during remediation stage, the fixes get applied twice, causing side-effects. The present disclosure uses the technique of identifying the issues in a state after remediating the issues identified in the previous states.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for automatically identifying applicable accessibility guidelines and determining remediation techniques for fixing issues in webpages being rendered, comprising:
   rendering during a first mode, by one or more hardware processors, one or more webpages associated with one or more enterprise web applications to be assessed for accessibility, wherein the first mode is an offline mode;
   capturing state identification rules, by the one or more hardware processors, to determine a state of the one or more enterprise web applications;
   automatically identifying during the first mode, by the one or more hardware processors, one or more applicable accessibility guidelines, based on one or more user interface elements comprised in the one or more rendered webpages;
   automatically analyzing during the first mode, via one or more analysing analyzing techniques executed by the one or more hardware processors, content associated with the one or more rendered webpages using the one or more applicable accessibility applicable guidelines to identify one or more webpage non-compliance issues, wherein the one or more webpage non-compliance issues are identified by analyzing syntactic structure of the one or more webpages including checking presence of alt-attributes in an image element, checking presence of heading semantic, checking presence of explicit association of labels with form inputs, and wherein identifying the one or more webpage non-compliance issues comprises:
   if type of the state is a page load, then automatically identifying the one or more webpage non-compliance issues on the page load;
   if the type of the state is mutant, then fixes for earlier state are applied and the one or more webpage non-compliance issues on new content are identified automatically, wherein the one or more webpage non-compliance issues are identified in the state after remediating non-compliance issues identified in the earlier state using incremental identification technique;
   automatically identifying by the one or more hardware processors, one or more remediation techniques based on the one or more webpage non-compliance issues being identified;
   applying a mutations application programming interface (API) by the one or more hardware processors, to detect at least one page load event, wherein a multi-page application page load is detected based on the at least one page load event;
   automatically determining, via the one or more remediation techniques executed by the one or more hardware processors, a number of fixes for the one or more webpage non-compliance issues based on the one or more webpages being rendered;
   locating an HTML element by the one or more hardware processors to apply the number of fixes through an attribute containing pre-remediation XPath; and
   overwriting, by the one or more hardware processors, non-compliant styling values using an inline Cascaded Styling Sheet (CS S) for the HTML element.

2. The processor implemented method of claim 1, further comprising applying, in a second mode, the number of determined fixes on a document object model (DOM) based on a current state of at least one of (i) the one or more rendered webpages and (ii) the one or more user interface elements comprised in the one or more rendered webpages to obtain one or more accessibility guidelines compliant-based webpages.

3. The processor implemented method of claim 2, wherein the current state of the at least one of (i) the one or more rendered webpages and (ii) the one or more user interface elements comprised in the one or more rendered webpages is indicative of the captured behavior of the one or more user interface elements, and wherein the captured behaviour comprises at least one of (a) one or more mutation events, (b) a new page load event, (c) a page layout change events, and (d) one or more network calls.

4. The processor implemented method of claim 1, wherein the one or more non-compliance issues in the one or more webpages are subjected to change in accordance with the change in the captured behavior of one or more user interface elements of the one or more webpages.

5. The processor implemented method of claim 2, further comprising
   determining, during the first mode, a change in the current state of at least one of (i) the one or more rendered webpages and (ii) the one or more user interface elements comprised in the one or more rendered webpages, wherein the change in the current state is determined by using the mutations API; and identifying, during the first mode, based on the change in the current state, a set of non-compliance issues.

6. A system, for automatically identifying applicable accessibility guidelines and determining remediation techniques for fixing issues in webpages being rendered, comprising:

a memory storing instructions;

one or more communication interfaces; and one or more hardware processors coupled to the memory via the one or more communication interfaces, wherein the one or more hardware processors are configured by the instructions to:

render during a first mode, by one or more hardware processors, one or more webpages associated with one or more enterprise web applications to be assessed for accessibility, wherein the first mode is an offline mode;

capture state identification rules to determine a state of the one or more enterprise web applications;

automatically identify during the first mode, by the one or more hardware processors, one or more applicable accessibility guidelines, based on one or more user interface elements comprised in the one or more rendered webpages;

automatically analyze during the first mode, via one or more analyzing techniques executed by the one or more hardware processors, content associated with the one or more rendered webpages using the one or more applicable accessibility applicable guidelines to identify one or more webpage non-compliance issues, wherein the one or more webpage non-compliance issues are identified by analyzing syntactic structure of the one or more webpages including checking presence of alt-attributes in an image element, checking presence of heading semantic, checking presence of explicit association of labels with form inputs, and wherein identifying the one or more webpage non-compliance issues comprises:

if type of the state is a page load, then automatically identifying the one or more webpage non-compliance issues on the page load;

if the type of the state is mutant, then fixes for earlier state are applied and the one or more webpage non-compliance issues on new content are identified automatically, wherein the one or more webpage non-compliance issues are identified in the state after remediating non-compliance issues identified in the earlier state using incremental identification technique;

automatically identify by the one or more hardware processors, one or more remediation techniques based on the one or more webpage non-compliance issues being identified;

apply a mutations application programming interface (API) by the one or more hardware processors, to detect at least one page load event, wherein a multi-page application page load is detected based on the at least one page load event;

automatically determine, via the one or more remediation techniques executed by the one or more hardware processors, a number of fixes for the one or more webpage non-compliance issues based on the one or more webpages being rendered;

locate an HTML element to apply the number of fixes through an attribute containing pre-remediation XPath; and overwrite non-compliant styling values using an inline Cascaded Styling Sheet (CSS) for the HTML element.

7. The system of claim 6, wherein the one or more hardware processors are further configured by the instructions to: apply, in a second mode, the number of determined fixes on a document object model (DOM) based on a current state of at least one of (i) the one or more rendered webpages and (ii) the one or more user interface elements comprised in the one or more rendered webpages to obtain one or more accessibility guidelines compliant-based webpages.

8. The system of claim 7, wherein the current state of the at least one of (i) the one or more rendered webpages and (ii) the one or more user interface elements comprised in the one or more rendered webpages is indicative of the captured behavior of the one or more user interface elements, and wherein the captured behaviour comprises at least one of (a) one or more mutation events, (b) a new page load event, (c) a page layout change events, and (d) one or more network calls.

9. The system of claim 6, wherein the one or more non-compliance issues in the one or more webpages are subjected to change in accordance with the change in the captured behavior of one or more user interface elements of the one or more webpages.

10. The system of claim 7, wherein the one or more hardware processors are further configured by the instructions to:

determine, during the first mode, a change in the current state of at least one of (i) the one or more rendered webpages and (ii) the one or more user interface elements comprised in the one or more rendered webpages, wherein the change in the current state is determined by using the mutations API; and identify, during the first mode, based on the change in the current state, a set of non-compliance issues.

11. One or more non-transitory machine readable information storage mediums comprising one or more instructions which when executed by one or more hardware processors causes automated identification of applicable accessibility guidelines, accessibility non-compliances issues, and determination of remediation techniques for fixing the accessibility non-compliances issues in webpages and determination of remediation techniques for fixing issues in webpages by:

rendering during a first mode, by the one or more hardware processors, one or more webpages associated with one or more enterprise web applications to be assessed for accessibility, wherein the first mode is an offline mode;

capturing state identification rules, by the one or more hardware processors, to determine a state of the one or more enterprise web applications;

automatically identifying during the first mode, by the one or more hardware processors, one or more applicable accessibility guidelines, based on one or more user interface elements (UI) comprised in the one or more rendered webpages;

automatically analyzing during the first mode, via one or more analysing analyzing techniques executed by the one or more hardware processors, content associated with the one or more rendered webpages using the one or more applicable accessibility applicable guidelines to identify one or more webpage non-compliance issues, wherein the one or more webpage non-compliance issues are identified by analyzing syntactic structure of the one or more webpages including checking presence of alt-attributes in an image element, checking presence of heading semantic, checking presence of explicit association of labels with form inputs, and wherein identifying the one or more webpage non-compliance issues comprises:
- if type of the state is a page load, then automatically identifying the one or more webpage non-compliance issues on the page load;
- if the type of the state is mutant, then fixes for earlier state are applied and the one or more webpage non-compliance issues on new content are identified automatically, wherein the one or more webpage non-compliance issues are identified in the state after remediating non-compliance issues identified in the earlier state using incremental identification technique;

automatically identifying by the one or more hardware processors, one or more remediation techniques based on the one or more webpage non-compliance issues being identified;

applying a mutations application programming interface (API) by the one or more hardware processors, to detect at least one page load event, wherein a multi-page application page load is detected based on the at least one page load event;

automatically determining, via the one or more remediation techniques executed by the one or more hardware processors, a number of fixes for the one or more webpage non-compliance issues based on the one or more webpages being rendered;

locating an HTML, element by the one or more hardware processors to apply the number of fixes through an attribute containing pre-remediation XPath; and overwriting, by the one or more hardware processors, non-compliant styling values using an inline Cascaded Styling Sheet (CSS) for the HTML element.

12. The one or more non-transitory machine readable information storage mediums of claim 11, wherein the instructions which when executed further cause the hardware processors to apply, in a second mode, the number of determined fixes on a document object model (DOM) based on a current state of at least one of (i) the one or more rendered webpages and (ii) the one or more user interface elements comprised in the one or more rendered webpages to obtain one or more accessibility guidelines compliant-based webpages.

13. The one or more non-transitory machine readable information storage mediums of claim 12, wherein the current state of the at least one of (i) the one or more rendered webpages and (ii) the one or more user interface elements comprised in the one or more rendered webpages is indicative of the captured behavior of one or more user interface elements, and wherein the captured behaviour comprises at least one of (a) one or more mutation events, (b) a new page load event, (c) a page layout change events, and (d) one or more network calls.

14. The one or more non-transitory machine readable information storage mediums of claim 11, wherein the one or more non-compliance issues in the one or more webpages are subjected to change in accordance with the change in the captured behavior of one or more user interface elements of the one or more webpages.

15. The one or more non-transitory machine readable information storage mediums of claim 12, wherein the instructions which when executed further cause the hardware processors to:
- determine, during the first mode, a change in the current state of at least one of (i) the one or more rendered webpages and (ii) the one or more user interface elements comprised in the one or more rendered webpages, wherein the change in the current state is determined by using the mutations API; and
- identify, during the first mode, based on the change in the current state, a set of non-compliance issues.

* * * * *